United States Patent
Maloo

(10) Patent No.: US 7,930,429 B2
(45) Date of Patent: Apr. 19, 2011

(54) SYSTEM AND METHOD FOR OBTAINING CONTENT FROM A CONTENT DELIVERY NETWORK

(75) Inventor: Sunil Maloo, Edison, NJ (US)

(73) Assignee: AT&T Intellectual Property I, LP, Reno, NV (US)

( * ) Notice: Subject to any disclaimer, the term of this patent is extended or adjusted under 35 U.S.C. 154(b) by 189 days.

(21) Appl. No.: 12/337,929

(22) Filed: Dec. 18, 2008

(65) Prior Publication Data

US 2010/0161799 A1     Jun. 24, 2010

(51) Int. Cl.
    *G06F 15/16*     (2006.01)
    *G06F 15/173*     (2006.01)

(52) U.S. Cl. ............... 709/245; 709/219; 709/226

(58) Field of Classification Search .......... None
See application file for complete search history.

(56) References Cited

U.S. PATENT DOCUMENTS

| | | | |
|---|---|---|---|
| 6,553,413 B1 | 4/2003 | Leighton et al. | |
| 6,654,807 B2 | 11/2003 | Farber et al. | |
| 7,054,935 B2 | 5/2006 | Farber et al. | |
| 7,133,905 B2 | 11/2006 | Dilley et al. | |
| 7,219,153 B1 | 5/2007 | Day | |
| 7,228,359 B1* | 6/2007 | Monteiro | 709/245 |
| 7,289,519 B1 | 10/2007 | Liskov | |
| 7,376,716 B2* | 5/2008 | Dilley et al. | 709/219 |
| 2003/0229682 A1* | 12/2003 | Day | 709/219 |

* cited by examiner

*Primary Examiner* — Wen-Tai Lin
(74) *Attorney, Agent, or Firm* — Larson Newman & Abel, LLP

(57) ABSTRACT

A method receives from a first server a first domain name system (DNS) request including a first internet protocol (IP) address of the first server, and a second IP address received by the first server from a first system. The method also maps a correlation between the first IP address and the second IP address, and receives from the first server a second DNS request. In response to receiving the second DNS request, the method responds to the first server with a third IP address of a second server, wherein the third IP address is chosen based upon the second IP address.

20 Claims, 5 Drawing Sheets

SYSTEM AND METHOD FOR OBTAINING CONTENT FROM A CONTENT DELIVERY NETWORK

FIELD OF THE DISCLOSURE

The present disclosure generally relates to communications networks, and more particularly relates to systems and methods for directing content requests to servers.

BACKGROUND

Packet-switched networks, such as networks based on the TCP/IP protocol suite, can distribute a rich array of digital content to a variety of client applications. One popular application is a personal computer browser for retrieving documents over the Internet written in the Hypertext Markup Language (HTML). Frequently, these documents include embedded content. Where once the digital content consisted primarily of text and static images, digital content has grown to include audio and video content as well as dynamic content customized for an individual user.

It is often advantageous when distributing digital content across a packet-switched network to divide the duty of answering content requests among a plurality of geographically dispersed servers. For example, popular Web sites on the Internet often provide links to "mirror" sites that replicate original content at a number of geographically dispersed locations. A more recent alternative to mirroring is content distribution networks (CDNs) that dynamically redirect content requests to an edge server situated closer to the client issuing the request. CDNs either co-locate edge servers within Internet Service Providers or deploy them within their own networks.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others.

Figure 1:
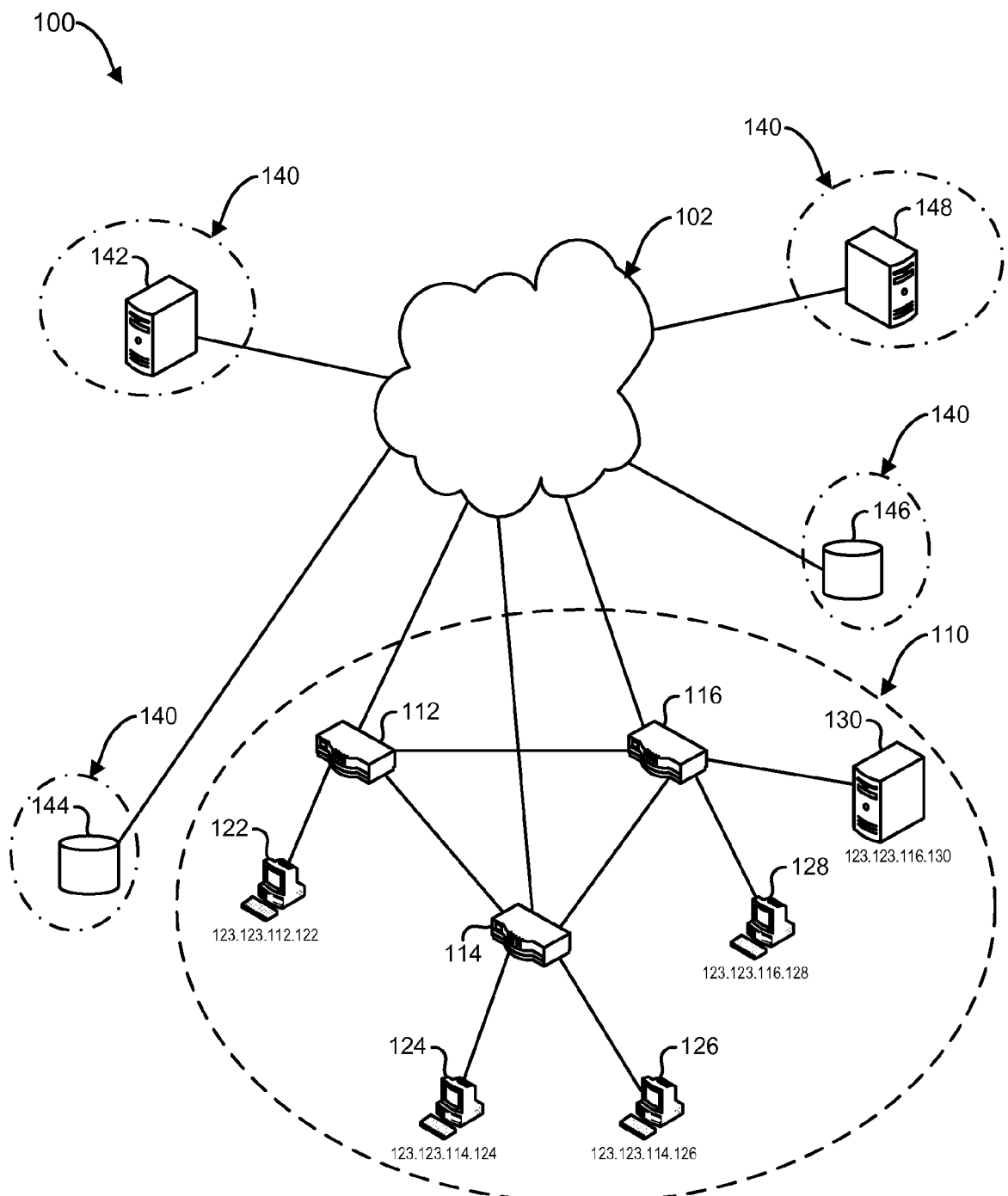
FIG. 1 is a schematic diagram showing a communication network, including an autonomous network and a content distribution network (CDN)

FIG. 1 shows a communication network 100. Communication network 100 includes an autonomous network (AN) 110 and a content distribution network (CDN) 140 that are connected together through a network 102, such as the Internet. AN 110 includes routers 112, 114, and 116 that communicate with each other. AN 110 connects to network 102 through routers 112, 114, and 116, permitting AN 110 to connect to other ANs (not illustrated) in communication network 100, and otherwise gain access to resources and content on communication network 100. AN 110 also includes client systems 122, 124, 126, and 128, and Internet service provider domain name system (ISP DNS) server 130. Client system 122 is connected to router 112, client systems 124 and 126 are connected to router 114, and client system 128 and ISP DNS server 130 are connected to router 116. Client systems 122, 124, 126, and 128, and ISP DNS server 130 gain access to resources and content on communication network 100 through their respective routers 112, 114, and 116. As such, router 112 provides ingress and egress to communication network 100 for client system 122, router 114 provides ingress and egress for client systems 124 and 126, and router 116 provides ingress and egress for client system 128 and for ISP DNS server 130. A non-limiting example of a client system 122, 124, 126, or 128 includes a personal computer, a laptop computer, a set-top box, a handheld computing device, another general purpose computing system, or a combination thereof. In a particular embodiment (not illustrated), one or more of routers 112, 114, and 116 are not connected directly to network 102. For example, router 114 may not be connected directly to network 102. Here client systems 124 and 126 obtain ingress and egress to communication network 100 through router 114, and either router 112 or 116, depending upon routing conditions in AN 110.

While not shown to scale, FIG. 1 represents client systems 122, 124, 126, and 128 as being in close proximity to each other, and DNS ISP server 130 as being more remote from client systems 122, 124, 126, and 128. Client systems 122, 124, 126, and 128, and DNS ISP server 130 each have a unique public routable Internet Protocol (IP) address. For example, client system 122 can have an IP address of 123.123.112.122, client system 124 can have an IP address of 123.123.114.124, client system 126 can have an IP address of 123.123.114.126, client system 128 can have an IP address of 123.123.116.128, and DNS ISP server 130 can have an IP address of 123.123.116.130. For example, client systems 122, 124, 126, and 128 can be located in New York City, and DNS ISP server 130 can be located in Chicago.

CDN 140 includes a content distribution network domain name system (CDN DNS) server 142, and edge servers 144 and 146. CDN 140 is a distributed network, with edge servers 144 and 146 situated at different locations in communication network 100. For example, edge server 144 can be located in New Jersey, and edge server 146 can be located in Chicago. CDN 140 connects to network 102 through peering points at CDN DNS server 142, and edge servers 144 and 146. With respect to communication network 100, the closest edge server may be the edge server having a shortest network distance, a lowest network cost, a lowest network latency, a highest link capacity, another measure of proximity on a network, or any combination thereof. As such, the distance between an edge server and a client system may be different from the geographic distance. While CDN DNS server 142 and edge servers 144 and 146 are shown as separate elements, it is also possible that the functions of CDN DNS server 142, as described below, can be merged into one or more of edge servers 144 and 146. It is also possible to locate CDN DNS server 142 and edge servers 144 and 146 within AN 110.

Client systems 122, 124, 126, and 128 can retrieve information from communication network 100. For example, client system 124 can retrieve a content provider's webpage, where the web page content resides on a content server (not illustrated). Additionally, client system 124 may download content files, such as graphic, audio, and video content, and program files such as software updates, from the content server. However, client systems 122, 124, 126, and 128 need to know the IP address of the content server in order to retrieve the information.

When a user knows the IP address of the content server, then the user can request the information directly from the content server. However, it is more often the case that a user does not know the IP address of the content server, but instead knows a domain name associated with the desired content. For example, a user of client system 124 may know that the desired information is located on a server associated with the domain name "www.att.com." In this case, the user can enter a Uniform Resource Locator (URL), including the domain name, into client system 124. Client system 124 attempts to resolve the domain name into a known IP address of the content server associated with the domain name. The resolution is done by referring to an operating system host file that includes a list of domain names and their associated IP addresses (hereinafter referred to as domain name/IP address pairs). If the OS host file includes a domain name/IP address pair for the domain name in the URL, then client system 124 sends an information request to the IP address of the content server associated with the domain name, and the content server returns the requested information.

When the OS host file does not include a domain name/IP address pair for the domain name included in the URL, then client system 124 sends a DNS request to ISP DNS server 130. The DNS request is a request for ISP DNS server 130 to resolve the domain name into the IP address of the content server associated with the domain name. ISP DNS server 130 forwards the DNS request to an authoritative DNS server (not illustrated) for the domain to which the domain name belongs. The authoritative DNS server replies to ISP DNS server 130 with the IP address of the content server associated with the domain name, and ISP DNS server 130 in turn replies to client system 124 with the IP address. Client system 124 then sends an information request to the IP address of the content server, and the content server returns the requested information. ISP DNS server 130 also stores the domain name/IP address pair in a cache, so that, when ISP DNS server 130 receives a subsequent DNS request, ISP DNS server 130 can attempt to resolve the domain name by referring first to the cache. Then, if the cache includes the domain name/IP address pair for the domain name in the DNS request, then DNS ISP server 130 can reply directly to client system 124 without sending the DNS request to the authoritative DNS server.

The time required for client system 124 to retrieve the information from the content server normally relates to the size of the file, the distance the information travels, and congestion along the route. Additionally, the load on the content server is related to the number of client systems 122, 124, 126, and 128 that are actively retrieving information at the same time. Therefore, resources such as processors, memory, and content server bandwidth limit the number of client systems 122, 124, 126, and 128 that can simultaneously retrieve information from the content server.

A content provider can use CDN 140 to reduce the load on the content server. As such, edge servers 144 and 146 replicate the information found on the content server at locations within communication network 100 that are closer to client systems 122, 124, 126, and 128. When client system 122, 124, 126, or 128 request information from the content provider, a request for DNS resolution is sent to ISP DNS server 130. ISP DNS server 130 requests the IP address corresponding to the domain name from the authoritative DNS server. When the domain name is for a content provider that uses CDN 140 to reduce the load on their content server, the authoritative DNS server for that domain name is CDN DNS server 142. CDN DNS server 142 provides the IP address of a closer edge server 144 or 146 based upon the source IP address of the DNS request, that is, the IP address of ISP DNS server 130. ISP DNS server 130 returns the IP address of the selected edge server 144 or 146 to the requesting client system 122, 124, 126, or 128. The requesting client system 122, 124, 126, or 128 sends an information request to the selected edge server 144 or 146, which returns the requested information. CDN DNS server 142 determines which edge server 144 or 146 to redirect the request to, based upon the shortest network distance, the lowest network cost, the lowest network latency, the highest link capacity, another measure of proximity on a network, or any combination thereof. As such, the distance between the selected edge server 144 or 146 and the requesting client system 122, 124, 126, or 128 may be different from the geographic distance. It is also possible for more than one content provider to use the same CDN 140.

Figure 2:
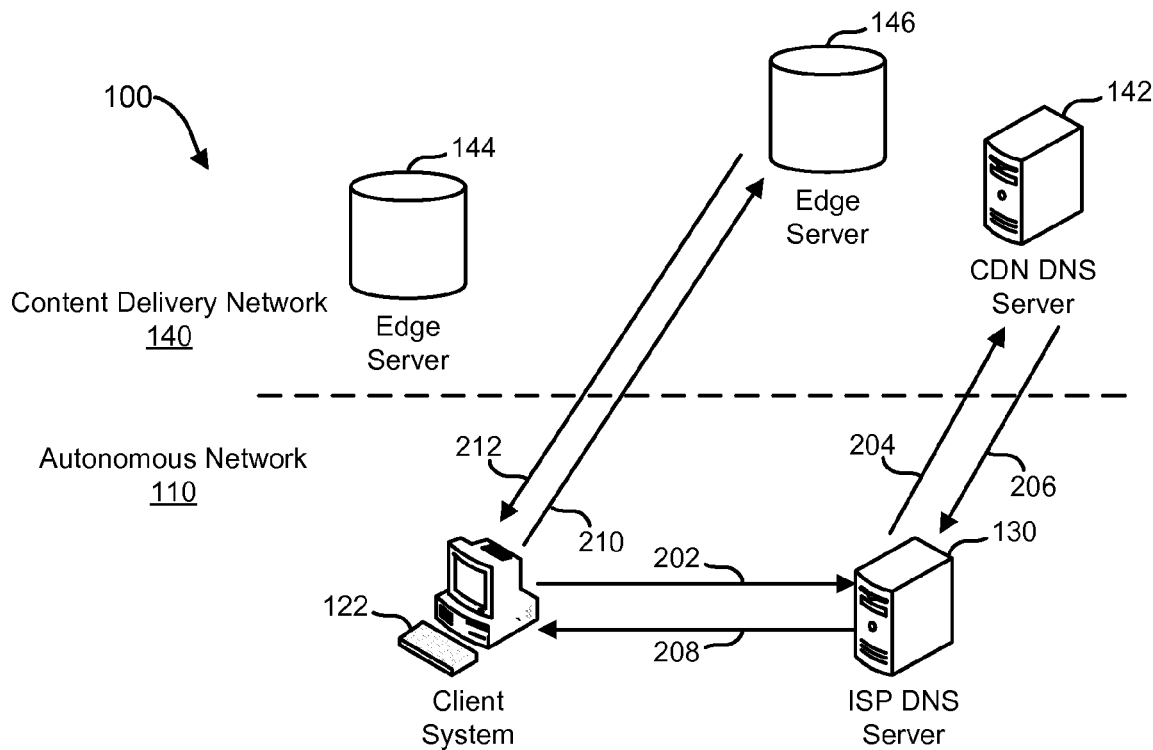
FIG. 2 is a schematic illustration showing interactions between elements of the communication network of FIG. 1 that provide content from the CDN to a client system.

FIG. 2 illustrates interactions between elements of communication network 100 to provide client system 122 with content from CDN 140. When client system 122 desires to receive information from a content provider that uses CDN 140, client system 122 sends a DNS request 202 to ISP DNS server 130. ISP DNS server 130 attempts to resolve the IP address associated with the requested domain name, translating the domain name into an IP address. If the domain name/IP address pair is not in the cache of ISP DNS server 130, ISP DNS server 130 forwards a DNS request 204 to CDN DNS server 142. DNS request 204 includes at least the domain name to be resolved, and the source IP address of DNS request 204, that is, the IP address of ISP DNS server 130. CDN DNS server 142 determines which of edge servers 144 or 146 is closer to the source IP address of DNS request 204. However, a different edge server 144 or 146 may actually be closer to the source IP address of DNS request 202, but the source IP address of DNS request 202 is masked by the actions of ISP DNS 130.

Using the previous examples, based on the IP address of ISP DNS server 130, located in Chicago, CDN DNS server 142 selects edge server 146, also located in Chicago, as closer to the source of DNS request 204, and sends a reply 206 to ISP DNS server 130 including the IP address of edge server 146 as the location of the requested information. ISP DNS server 130 the IP address of edge server 146 to client system 122 in a reply 208. Upon receipt of reply 208, client system 122 sends an information request 210 for the information to edge server 146. Edge server 146 sends a reply 212 with the requested information to client system 122. Although edge server 144, located in New Jersey is actually closer to client system 122, located in New York, CDN DNS server 142 selects edge server 146 in Chicago to provide the requested information based upon the source IP address of ISP DNS server 130 which is also in Chicago. In other words, ISP DNS server 130 masks the origin of DNS request 202, preventing CDN DNS server 142 from selecting the closer of edge servers 144 and 146 to provide the response to information request 210.

Figure 3:
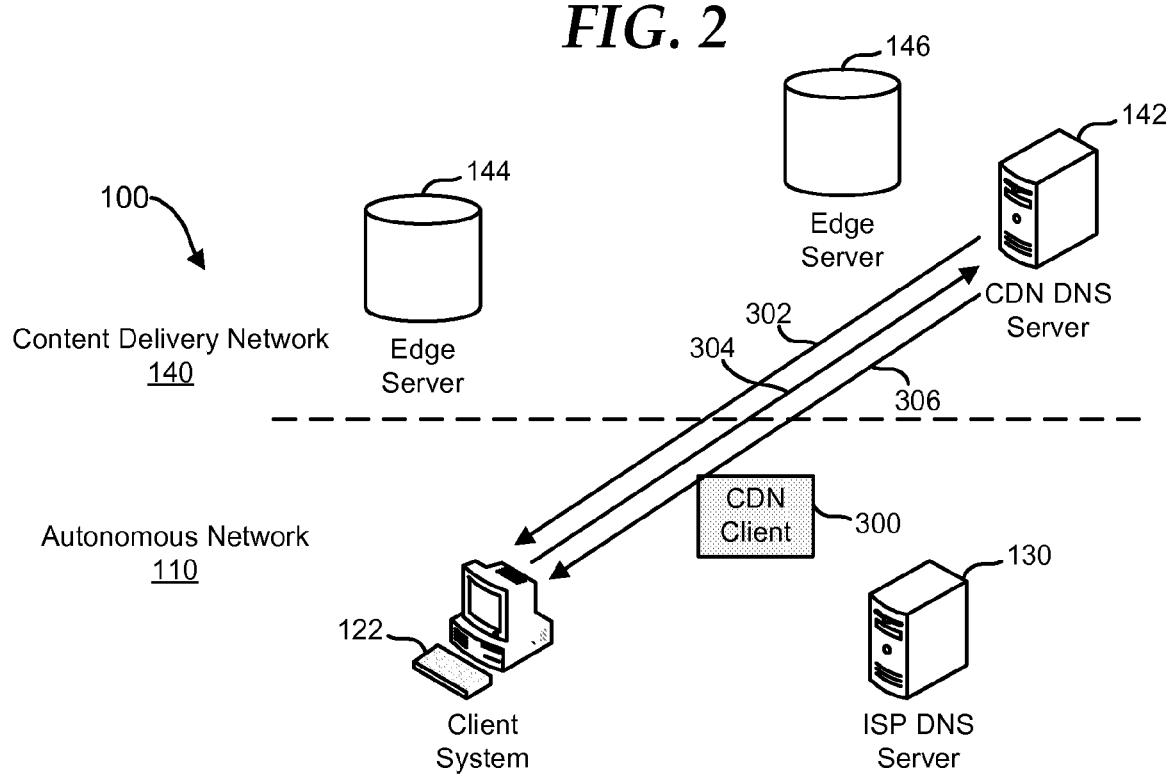
FIG. 3 is a schematic illustration showing downloading CDN client software to the client system.

In an embodiment of the present disclosure, CDN DNS server 142, edge servers 144 or 146, or another server in CDN 140 can determine if client systems 122, 124, 126, and 128 have requested information from CDN 140 before, for example by examining cookies on client systems 122, 124, 126, and 128. If client systems 122, 124, 126, and 128 have not previously requested information from CDN 140, then in addition to redirecting client systems 122, 124, 126, and 128 to edge servers 144 and 146, CDN 140 can download CDN client software (shown as element 300 in FIG. 3) to client systems 122, 124, 126, and 128. FIG. 3 illustrates downloading CDN client software 300 to client system 122. CDN DNS server 142 sends a request 302 to client system 122, prompting the user of client system 122 to decide whether or not to download CDN client software 300. If the user of client system 122 decides to download CDN client software 300, the user can so indicate, and client system 122 sends a reply 304 to CDN DNS server 142. Upon receiving reply 304, CDN DNS server 142 sends a download 306 to client system 122. Download 306 includes CDN client software 300 that may be installed on client system 122. In another embodiment, edge server 146, or another server in CDN 140 (not illustrated) functions similarly to CDN DNS server 142, by sending request 302, receiving reply 304, and sending download 306. In another embodiment, sending request 302, receiving reply 304, and sending download 306 can be performed by a combination of CDN DNS server 142, edge server 146, and another server in CDN 140 (not illustrated). In yet another embodiment (not illustrated), one or more of request 302, reply 304, and download 306 can pass through ISP DNS 130.

Figure 4:
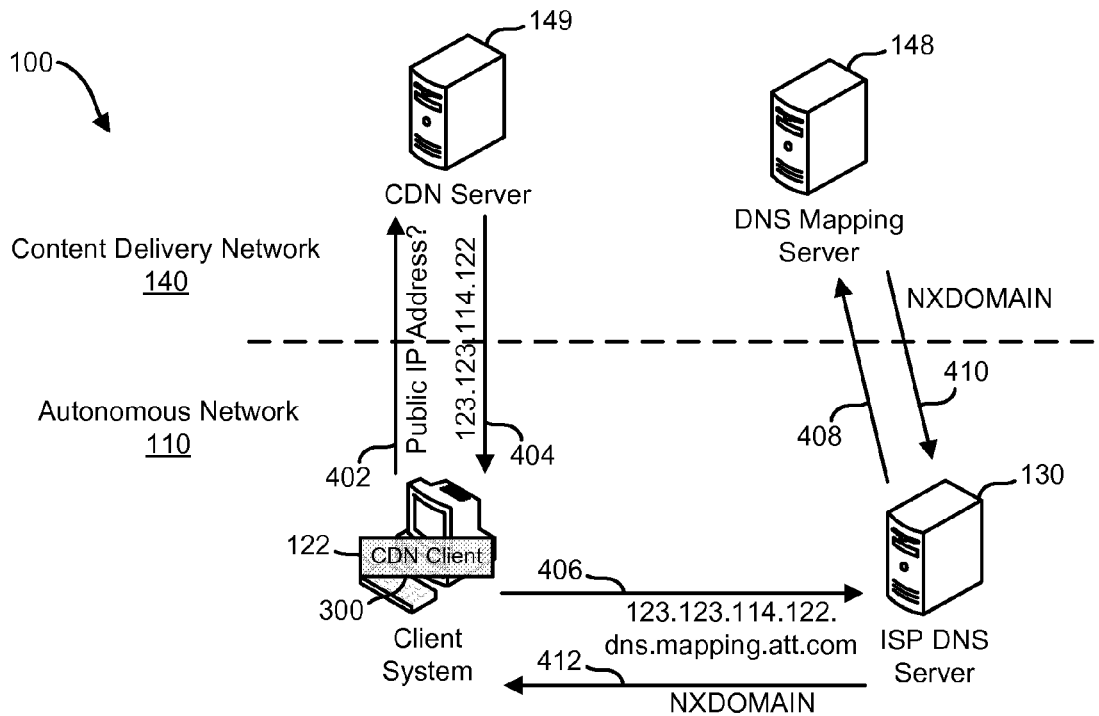
FIG. 4 is a schematic illustration showing interactions between elements of the communication network after installing the CDN client software on the client system.

FIG. 4 illustrates interactions among elements of communication network 100 after CDN client software 300 is installed on client system 122. Here, client software 300 issues a request 402 to CDN server 149 to determine the public routable IP address of client system 122. CDN server 149 returns a reply 404 with the public routable IP address of client system 122, for example "123.123.114.122." In another embodiment (not illustrated), client software 300 issues request 402 to, and receives reply 404 from another server (not illustrated) in network 102, in AN 110, or in CDN 140. Then client software 300 sends a DNS request 406 to ISP DNS server 130. DNS request 406 includes a domain name with the public routable IP address of client system 122 and the domain name associated with DNS mapping server 148. For example, DNS request 406 can include the domain name 123-123-114-122.dns.mapping.att.com. ISP DNS server 130 attempts to translate the domain name into an IP address. If the domain name/IP address pair is not in the cache of ISP DNS server 130, ISP DNS server 130 determines that DNS mapping server 148 is the authoritative DNS server for the requested URL, and forwards a DNS request 408 to DNS mapping server 148. DNS request 408 includes the IP address of ISP DNS server 130 as the source IP address of request 408, and the public routable IP address of client system 122. DNS mapping server 148 sends a reply 410 to DNS ISP server, which in turn forwards a reply 412 to client system 122. Replies 410 and 412 can be a valid response, such as a "non-existent domain" (NXDOMAIN) reply, a loopack address (127.0.0.1), or another valid response.

Figure 5:
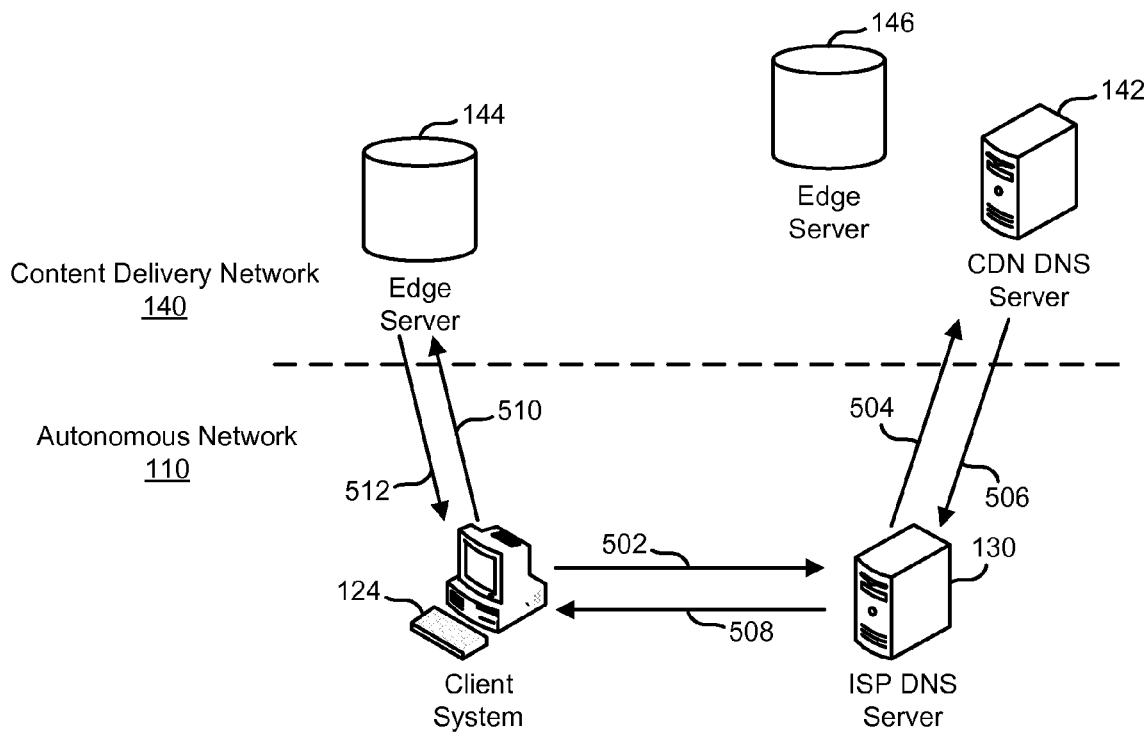
FIG. 5 is a schematic illustration showing interactions between elements of the communication network after the CDN correlates an internet service provider's domain name system server location to the client systems that are served by the internet service provider.

With both the public routable IP address of client system 122 and the IP address of ISP DNS server 130 as the source IP address, DNS mapping server 148 correlates ISP DNS server 130, in Chicago in the above example, with client system 122, in New York City. Using this information, CDN 140 can predict that other requests routed through ISP DNS server 130 might also be originating from locations in the same area, New York City, even though ISP DNS server 130 is located in Chicago. For example, FIG. 5 illustrates interactions between elements of communication network 100 after CDN 140 correlates ISP DNS server 130 with the location of client systems 122, 124, 126, and 128 that are served by ISP DNS server 130.

When client system 124 desires to receive information from CDN 140, client system 124 sends a request 502 to ISP DNS server 130. ISP DNS server 130 attempts to translate the domain name into an IP address. If the domain name/IP address pair is not in the cache of ISP DNS server 130, ISP DNS server 130 determines that CDN DNS server 142 is the authoritative DNS server for the requested domain, and forwards a request 504 to CDN DNS server 142. Request 504 includes at least the IP address of CDN DNS 142, the domain name that needs to be resolved, and the IP address of ISP DNS server 130 as the source IP address of request 504. CDN DNS server 142 recognizes ISP DNS server 130 as the source of request 504, and although ISP DNS server 130 is located in Chicago, CDN DNS server 142 predicts that the source IP address of the real requester, client system 124, is located close to client system 122, in New York City. Based on this prediction, CDN DNS server 142 determines that edge server 144 located in New Jersey is closer and may provide content more efficiently to the real requester, client system 124. Thus CDN DNS server 142 then sends a reply 506 to ISP DNS server 130 that includes the IP address of edge server 144 as the location of the requested information. ISP DNS server 130 sends a reply 508 to client system 124 that includes the IP address of edge server 144, as received from CDN DNS server 142. Upon receipt of the reply 508, client system 124 sends a request 510 for the information to edge server 144. Edge server 144 provides the requested information 512 to client system 124. Note that, because CDN 140 has correlated requests from ISP DNS server 130, in Chicago, to client systems 122, 124, 126, and 128, in New York City, CDN 140 more accurately predicts the actual location of requests handled by ISP DNS server 130.

Figure 6:
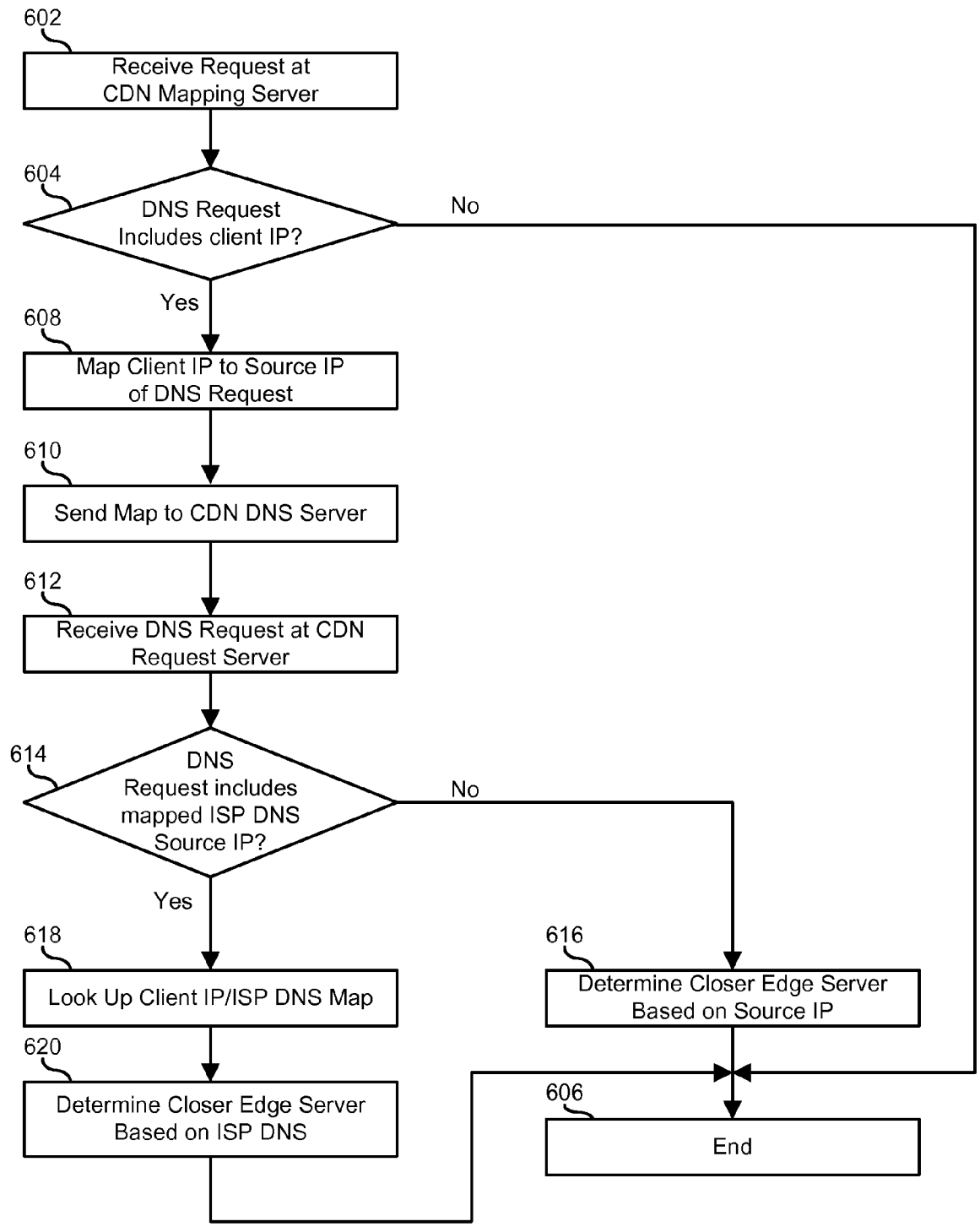
FIG. 6 is a flow chart showing a method of determining the location of a request on a CDN.

FIG. 6 illustrates a method of determining the location of a request on a CDN. A request is received by a CDN mapping server in block 602. For example, a client system can initiate a DNS request that includes the host name of a CDN mapping server, which the ISP DNS server forwards to the CDN mapping server. A decision is made as to whether or not the request includes a client IP address in decision node 604. If not, then the "NO" branch of decision node 604 is taken, and processing ends at block 606. If the request includes a client IP address, then the "YES" branch of decision node 604 is taken and the client IP address is mapped to the source IP address of the request in block 608. For example, the mapping server can include a mapping table or database that correlates received client IP addresses with the associated ISP DNS servers that send the requests.

In a particular embodiment, the CDN mapping server and the CDN DNS server are separate servers. In this case, the CDN mapping server sends the mapping information to the CDN DNS server in block 610. The CDN DNS server receives a DNS request in block 612. A decision is made as to whether or not the source address of the DNS request is included in the mapping information in decision node 614. If not, then the "NO" branch of decision node 614 is taken, and the CDN DNS server determines the IP address of a CDN edge server that is closer to the ISP DNS server, and responds to the DNS request in block 616, and processing ends in block 606. If the source address of the DNS request is included in the mapping information, then the "YES" branch of decision node 614 is taken, and the associated client IP address is determined from the mapping information in block 618. The CDN DNS server determines the IP address of a CDN edge server that is closer to the client IP address, and responds to the DNS request in block 620, and processing ends in block 606.

In another embodiment, a client system can be pre-populated with CDN client software from the CDN. For example, a computer manufacturer may desire to promote the services of a particular content provider, and so may include pre-populated software on their computer products that advertise for the particular content provider. Here, it may be an additional benefit to the content provider and to the computer manufacturer to speed up access to the content provider's content by including CDN client software with the pre-populated software.

Figure 7:
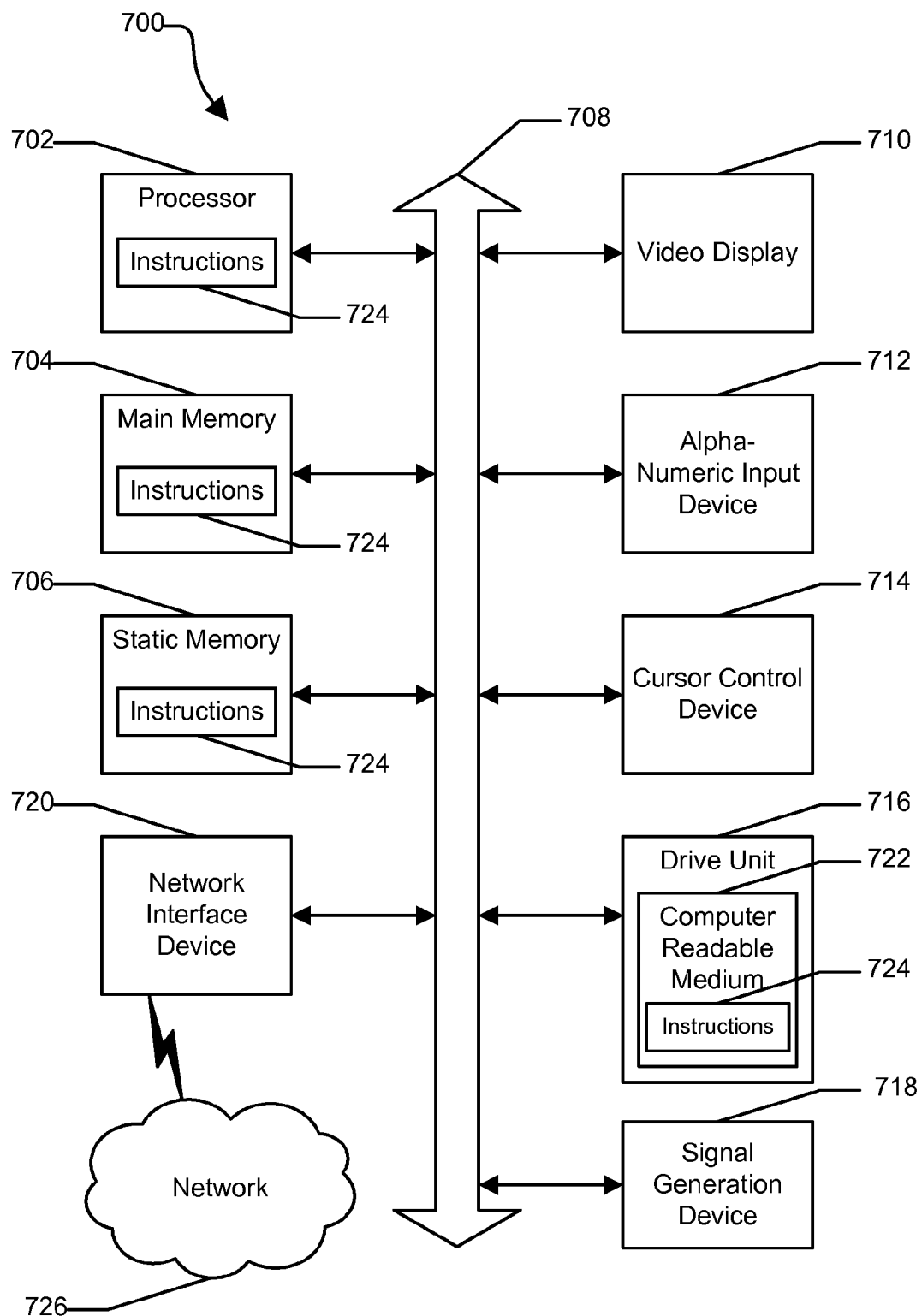
FIG. 7 shows an illustrative embodiment of a general computer system 700.

FIG. 7 shows an illustrative embodiment of a general computer system 700. The computer system 700 can include a set of instructions that can be executed to cause the computer system to perform any one or more of the methods or computer based functions disclosed herein. The computer system 700 may operate as a standalone device or may be connected, such as by using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 can also be implemented as or incorporated into various devices, such as a personal computer (PC), a tablet PC, an STB, a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 700 can be implemented using electronic devices that provide voice, video or data communication. Further, while a single computer system 700 is illustrated, the term "system" shall also be taken to include any collection of systems or sub-systems that individually or jointly execute a set, or multiple sets, of instructions to perform one or more computer functions.

The computer system 700 may include a processor 702, such as a central processing unit (CPU), a graphics processing unit (GPU), or both. Moreover, the computer system 700 can include a main memory 704 and a static memory 706 that can communicate with each other via a bus 708. As shown, the computer system 700 may further include a video display unit 710 such as a liquid crystal display (LCD), an organic light emitting diode (OLED), a flat panel display, a solid-state display, or a cathode ray tube (CRT). Additionally, the computer system 700 may include an input device 712 such as a keyboard, and a cursor control device 714 such as a mouse. Alternatively, input device 712 and cursor control device 714 can be combined in a touchpad or touch sensitive screen. The computer system 700 can also include a disk drive unit 716, a signal generation device 718 such as a speaker or remote control, and a network interface device 720 to communicate with a network 726. In a particular embodiment, the disk drive unit 716 may include a computer-readable medium 722 in which one or more sets of instructions 724, such as software, can be embedded. Further, the instructions 724 may embody one or more of the methods or logic as described herein. In a particular embodiment, the instructions 724 may reside completely, or at least partially, within the main memory 704, the static memory 706, and/or within the processor 702 during execution by the computer system 700. The main memory 704 and the processor 702 also may include computer-readable media.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method comprising the following computer-implemented steps:

receiving from a first server a first domain name system request including a first internet protocol address of the first server, and a second internet protocol address received by the first server from a first system, the domain name system request being received by a second server, wherein the second server is a content delivery network mapping server;

mapping at the second server a correlation between the first internet protocol address and the second internet protocol address;

receiving from the first server a second domain name system request; and in response to receiving the second domain name system request, responding to the first server with a third internet protocol address of a third server, wherein;

the third internet protocol address is chosen based upon the second internet protocol address; and the second domain name system request is received by the first server from a second system.

2. The method of claim 1 further comprising, in response to the first domain name system request, responding to the first server with a loopback response.

3. The method of claim 1 further comprising:

in response to mapping the correlation, receiving at a fourth server the mapping between the first internet protocol address and the second internet protocol address; and wherein the second domain name system request is received by the fourth server.

4. The method of claim 3 wherein the second server, the third server, and the fourth server comprise a content delivery network.

5. The method of claim 1 wherein the first server is an Internet Service Provider domain name system server.

6. The method of claim 1 wherein the first system is a client of an Internet Service Provider.

7. The method of claim 1 wherein the third server is a content delivery network edge server.

8. A non-transitory computer readable medium including instructions for carrying out a method, the method comprising:

receiving from a first server a first domain name system request including a first internet protocol internet protocol address of the first server, and a second internet protocol address received by the first server from a first system, the first domain name system request being received by a second server, wherein the second server is a content delivery network mapping server;

mapping at a second server a correlation between the first internet protocol address and the second internet protocol address;

receiving from the first server a second domain name system request; and in response to receiving the second domain name system request, responding to the first server with a third internet protocol address of a third server, wherein the third internet protocol address is chosen based upon the second internet protocol address.

9. The non-transitory computer readable medium of claim 8, the method further comprising, in response to forwarding the first domain name system request, responding to the first server with a loopback response.

10. The non-transitory computer readable medium of claim 8, wherein the second domain name system request is received by the first server from a second system.

11. The non-transitory computer readable medium of claim 8, the method further comprising:

in response to mapping the correlation, receiving at a fourth server the mapping between the first internet protocol address and the second internet protocol address; and wherein the second domain name system request is received by the fourth server.

12. The non-transitory computer readable medium of claim 11, wherein the second server, the third server, and the fourth server comprise a content delivery network.

13. The non-transitory computer readable medium of claim 8 wherein the first server is an Internet Service Provider domain name system server.

14. The non-transitory computer readable medium of claim 8 wherein the first system is a client of an Internet Service Provider.

15. The non-transitory computer readable medium of claim 8 wherein the third server is a content delivery network edge server.

16. A method comprising the following computer-implemented steps:

receiving at a first server a first domain name system request from a second server, the first domain name system request being received from a first system, wherein the first domain name system request comprises a domain name to be resolved, the domain name including a first internet protocol address associated with the first system, and wherein the first domain name system request includes a second internet protocol address associated with the second server as a source internet protocol address of the forwarded domain name system request;

mapping at the first server a correlation between the first internet protocol address and the second internet protocol address;

receiving at the first server a second domain name system request from the second server; and in response to receiving the second domain name system request, responding from the first server to the second server with a third internet protocol address of a third server, wherein the third internet protocol address is chosen based upon the correlation of the first internet protocol address and the second internet protocol address.

17. The method of claim 16 further comprising, in response to forwarding the first domain name system request, responding to the second server with a loopback response.

18. The method of claim 16 wherein:

the second domain name system request is received by the second server from a second system;

the first domain name system request is received by a fourth server; and the mapping is done by the fourth server.

19. The method of claim 18 wherein the fourth server is a content delivery network mapping server.

20. The method of claim 18 further comprising:

in response to mapping the correlation, receiving at a fifth server the mapping between the first internet protocol address and the second internet protocol address; and wherein the second domain name system request is received by the fifth server.

* * * * *